(12) United States Patent
LaRosa

(10) Patent No.: US 8,051,972 B1
(45) Date of Patent: Nov. 8, 2011

(54) NON-UNIFORM PULSE-DRIVEN CONVEYOR AND METHOD OF USING THE SAME

(76) Inventor: Joseph J LaRosa, Cincinnati, OH (US)

( * ) Notice: Subject to any disclaimer, the term of this patent is extended or adjusted under 35 U.S.C. 154(b) by 57 days.

(21) Appl. No.: 12/714,717

(22) Filed: Mar. 1, 2010

Related U.S. Application Data

(60) Provisional application No. 61/155,965, filed on Feb. 27, 2009.

(51) Int. Cl.
  *B65G 25/00* (2006.01)
(52) U.S. Cl. .............. 198/468.01; 198/468.9; 198/750.1
(58) Field of Classification Search ............. 198/468.01, 198/468.9, 750.1, 750.14, 753, 766
See application file for complete search history.

(56) References Cited

U.S. PATENT DOCUMENTS

| | | | | |
|---|---|---|---|---|
| 3,735,854 | A | * | 5/1973 | Hirsch et al. ............. 198/468.01 |
| 3,921,970 | A | | 11/1975 | Stanfield |
| 4,226,326 | A | * | 10/1980 | Watkins ........................ 198/758 |
| 4,651,869 | A | * | 3/1987 | Grief ........................... 198/750.1 |
| 5,181,949 | A | * | 1/1993 | Egloff ....................... 198/468.01 |
| 6,029,796 | A | * | 2/2000 | Musschoot ................... 198/753 |
| 6,155,404 | A | | 12/2000 | Musschoot |
| 6,357,579 | B1 | | 3/2002 | Patterson et al. |
| 2001/0015314 | A1 | | 8/2001 | Kroger |

* cited by examiner

*Primary Examiner* — James R Bidwell
(74) *Attorney, Agent, or Firm* — David M. Lafkas; Wolfe, LPA

(57) ABSTRACT

The present invention is a conveyor using a non-uniform pulsating movement created by multiple interactions between a solenoid and switch to move parts along a transporting tray.

18 Claims, 1 Drawing Sheet

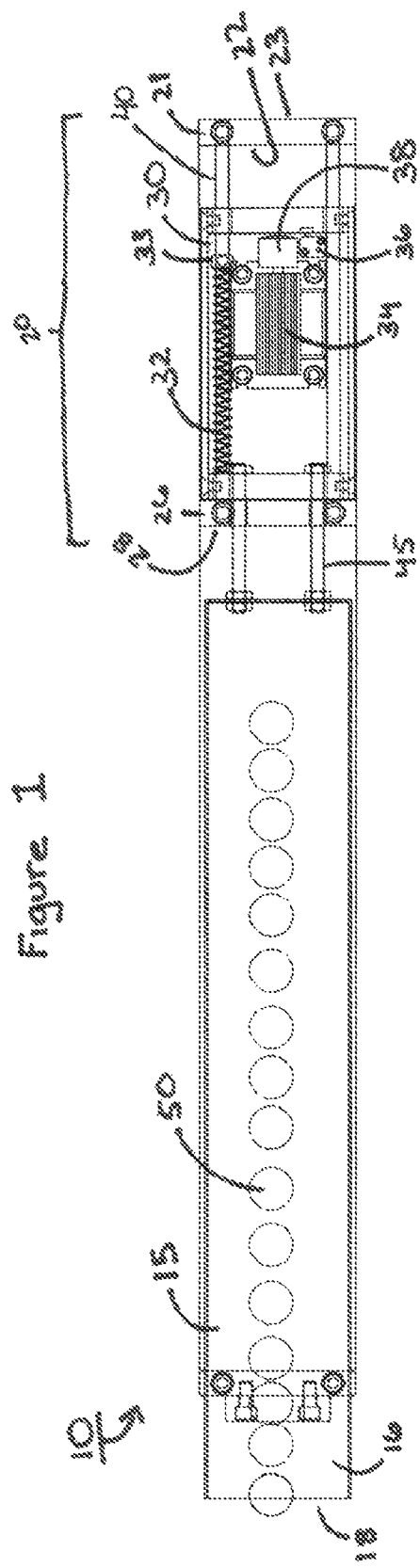
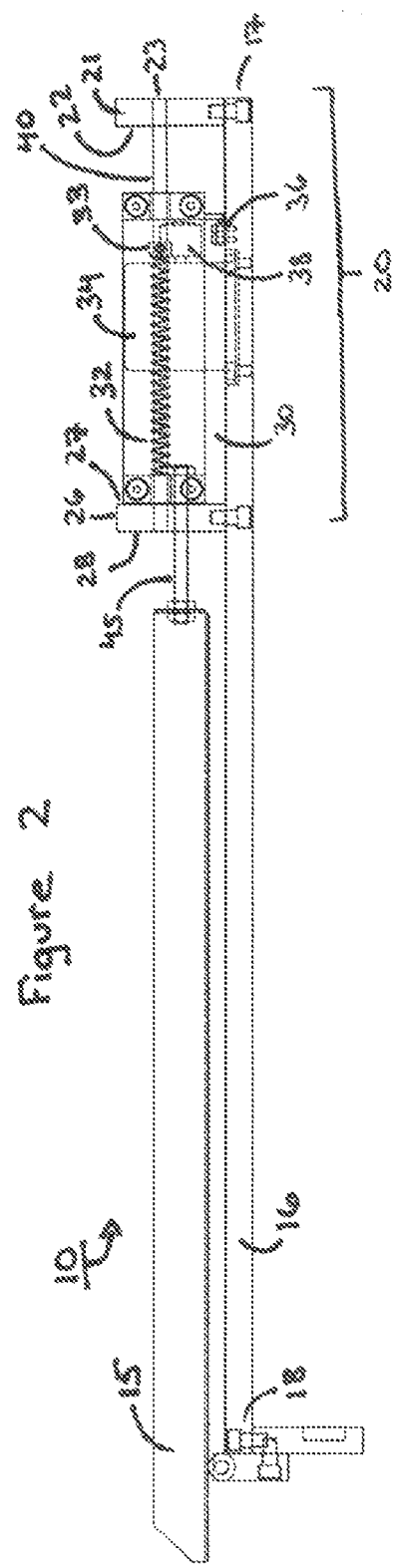

NON-UNIFORM PULSE-DRIVEN CONVEYOR AND METHOD OF USING THE SAME

CROSS-REFERENCE TO RELATED APPLICATION

The present application claims priority to provisional U.S. patent application No. 61/155,965 filed Feb. 27, 2009.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to vibratory feeders and conveyors, and more particularly to linear non-uniform pulsating motion conveyors.

2. Description of the Related Art

Conventional designs of reciprocating conveyors usually employ electromagnetic drives or motor-driven mechanical drives. An electromagnetic drive utilizes the oscillating magnetic attraction between a magnet armature and a pole face of a magnet. Practical use of the electromagnetic drive requires that the magnet armature be in relative close proximity to be attracted to the pole face of the magnet, putting a severe limitation on the maximum stroke obtainable, usually under 0.1 inches. The design must operate at higher frequencies, about 30 Hz and higher, in order to achieve the accelerations needed to obtain the desired conveying feed rates. Motor driven mechanical drives typically include rotary motors that spin eccentric weights or turn shafts which are connected to cams or crank arms. Mechanical drives convert rotary motion to linear vibratory motion and produce some form of harmonically varying stroke at a set frequency. Mechanical drives generally operate at strokes up to 1 inch, at frequencies ranging from 8 Hz to 20 Hz.

One type of reciprocating vibratory conveyor is known as a differential motion conveyor. This type of conveyor utilizes a motor driven mechanism containing at least two geared shafts with weights of differing eccentricities on each shaft. The mechanism produces a linear reciprocal horizontal motion of the conveying surface that has a lower acceleration and velocity in the forward direction than in its rearward direction. This difference in acceleration and velocity allows the product being conveyed to slip less in the forward direction than when the conveying surface is accelerating in its rearward direction, thus the product moves forward along the conveying surface.

Some conveyors in the prior art use some form of an electromagnetic linear motor as a drive mechanism. There are several examples of electromagnetic linear motors. For example, a voice coil actuator uses a coil located in a magnetic field which exerts a force on the coil when a current is conducted through the coil. Another example is an induction motor, which uses a stator having coils and an armature made of magnetic material, and are typically used as motors for trains and monorails. Induction of currents generated in the armature creates magnetic fields which are either attracted or repulsed by magnetic fields generated by the stator coils. A moving magnet motor is another example, and this motor uses a stator with a plurality of coils which are sequentially energized by a control. An armature carrying permanent magnets is moved in relation to the stator by the energized coils.

Other conveyors of the prior art include electromagnetic, linear-motor-driven differential motion conveyors. However, conveyors in the prior art have been driven by a continuous, substantially homogeneous vibration. This uniform vibration could cause parts to transports to stagnate, instead of being transported as intended. Many conveyors in the prior art are known to be massive in size and relatively immobile. Thus, what is needed is a conveyor that relies on non-uniform pulses, can be driven by a solenoid, and can be easily sized and adapted to different types of machinery.

SUMMARY

Various exemplary embodiments of the present invention include a conveyor comprised of a base plate having a first end and a second end, a transporting tray resting on top of the base plate, and a driving means connected to the first end of the base plate and connected to the transporting tray. The driving means is comprised of a first end plate having a first front face and a first back face, a second end plate having a second front face and a second back face, one or more carriage guide pins, a sliding carriage frame, at least one spring, a solenoid, and a switch. At least one of the one or more guide pins are connected between the first front face and the second front face. The sliding carriage frame is positioned between the first front face and the second front face, wherein the sliding carriage frame substantially rests upon the at least one or more carriage guide pins. The at least one spring is connected at one end to an inner wall of the sliding carriage closest to the second front face and connected to at a second end to a tension adjusting collar. The solenoid is connected to the base plate, connected to a bumper, and positioned within the sliding carriage frame. The switch is connected to a power source such that when the at least one spring is in an expanded position, the switch and solenoid are adjacent to each other. The switch is in a closed position when the sliding carriage frame is closest to the second front face and the spring is in an expanded position. The solenoid is energized to drive the bumper into the sliding carriage frame and move the sliding carriage frame in a direction of the first front face until the compressed spring directs the sliding carriage frame back towards the second front face, thereby creating a reciprocating motion of which causes pulsating movement of the transporting tray that moves desired materials in the tray away from the driving means.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 1 is an illustrated top-view of an exemplary embodiment of the present invention.

FIG. 2 is an illustrated side view of an exemplary embodiment of the present invention.

DESCRIPTION OF THE REFERENCED NUMERALS

In reference to the drawings, similar reference characters denote similar elements throughout all the drawings. The following is a list of the reference characters and associated element:

- 10 conveyor
- 15 transporting tray
- 16 base plate
- 17 first end of the base plate
- 18 second end of the base plate
- 20 driving means
- 21 first end plate
- 22 first front face
- 23 first back face
- 26 second end plate
- 27 second front face
- 28 second back face
- 30 sliding carriage frame
- 32 spring
- 33 tension adjusting collar
- 34 solenoid
- 36 switch
- 38 bumper
- 40 carriage guide pin
- 45 connecting bar
- 50 transporting parts

DETAILED DESCRIPTION

FIGS. 1 and 2, along with the description here, relate to a pulse-driven conveyor for transporting parts. The conveyor illustrated and claimed herein may be used in conjunction with various machine tools, such as, for example, die stamps, saws, molds, and the like.

As opposed to much of the prior art in which the conveyors are driven by a continuous, substantially homogeneous vibration, the presently claimed invention relies on substantially non-uniform pulses to move parts along a transporting tray 15.

FIGS. 1 and 2 illustrate an exemplary embodiment of a conveyor 10 being comprised of a base plate 16, a transporting tray 15, and a driving means 20. In exemplary embodiments, the base plate may be further connected to a table, bench, floor, etc. by way of magnets.

The base plate has a first end 17 and a second end 18. The transporting tray rests on top of the base plate, either directly or indirectly. It is preferred that the transporting tray directs parts towards the second end of the base plate.

The driving means is connected to the first end of the base plate. The driving means is further connected to the transporting tray via one or more connecting bars 40.

In exemplary embodiments of the present invention, the driving means is comprised of a first end plate 21, a second end plate 26, one or more carriage guide pins 40, a sliding carriage frame 30, at least one spring 32, a solenoid 34, and a switch 36.

The first end plate is preferably positioned and/or connected to the first end of the base plate. The first end plate has a first front face 22 and a first back face 23. The first front face is preferably the face of the first end plate closest to the transporting tray.

The second end plate has a second front face 27 and a second back face 28. The second back face is preferably the face of the second end plate closest to the transporting tray.

In the various exemplary embodiments, the faces of the first end plate and the second end plate are substantially planar and substantially parallel respective to one another. The first front face and the second front face are positioned opposite one another at a predetermined distance based upon the size of driving means, conveyor, or both desired.

The first front face and the second front face are preferably connected to one another via one or more carriage guide pins 40. In a more preferred embodiment, at least one of the one or more carriage guide pins is substantially connected to both the first front face and the second front face.

A sliding carriage frame 30 is positioned to move between the first front face and the second front face. It is preferred that the sliding carriage moves in a substantially linear fashion, that is, for example, in a "back and forth" motion between the first front face and the second front face.

The sliding carriage frame may substantially rest upon the one or more carriage guide pins. In exemplary embodiments, the sliding carriage frame may substantially surround the one or more carriage guide pins.

The at least one spring of the driving means is connected at one end to an inner wall of the sliding carriage frame closest to the second front face. The opposing end of the at least one spring may be connected to a tension adjusting collar 33.

A solenoid is connected to the base plate and to a bumper 38. The bumper is preferably positioned to be at a height such that the bumper and an inner wall of the sliding carriage frame closest to the first front frame may come into substantial contact with one another.

The switch is connected to a power source (not shown). The power source may be a battery, direct current, alternating current, or the like.

The switch is positioned such that when the at least one spring is in an expanded position, the switch and the solenoid are substantially adjacent to each other.

Based on the above-described arrangement, the switch is in a closed position when the sliding carriage frame is closest to the second front face and the spring is in an expanded position. The solenoid is energized by the power through the switch, thereby driving the bumper into the sliding carriage frame and moving the sliding carriage frame in a direction of the first front face until the compressing spring directs the sliding carriage frame back towards the second front face. The interaction between the solenoid and switch develops into a non-uniform reciprocating motion which causes pulses to translate through the driving means, through the one or more connector bars, and to the transporting tray. The translation of the non-uniform pulses to the transporting tray develops into movement of desired materials in the tray away from the driving means.

The non-uniform reciprocating motion, or "driving force," of the driving means may be adjusted by altering the power via one or more of Rheostats, resistors, and the like. The driving force may also be altered by adjusting the tension of the spring by altering spring sizes, compression values, or modifying the tension adjusting collar.

The driving means may also be manipulated to be set on a timed pulse via a processing means (not shown).

As illustrated in the figures, the conveyor is preferably linear. That is, the driving means and the transporting tray are substantially in the same plane.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A conveyor comprised of:
   a base plate having a first end and a second end;
   a transporting tray resting on top of the base plate;
   a driving means connected to the first end of the base plate and connected to the transporting tray, the driving means being comprised of:
      a first end plate having a first front face and a first back face;
      a second end plate having a second front face and a second back face;
      one or more carriage guide pins, at least one of the one or more guide pins being connected between the first front face and the second front face;
      a sliding carriage frame positioned between the first front face and the second front face, wherein the sliding carriage frame substantially rests upon the one or more carriage guide pins;
      at least one spring connected at one end to an inner wall of the sliding carriage closest to the second front face and connected to at a second end to a tension adjusting collar;
      a solenoid connected to the base plate, connected to a bumper, and positioned within the sliding carriage frame; and
      a switch connected to a power source such that when the at least one spring is in a expanded position, the switch and solenoid are substantially adjacent to each other;
   wherein as the switch is in a closed position when the sliding carriage frame is closest to the second front face and the spring is in an expanded position, the solenoid is energized thereby driving the bumper into the sliding carriage frame and moving the sliding carriage frame in a direction of the first front face until the compressed spring directs the sliding carriage frame back towards the second front face, the reciprocating motion of which causes pulsating movement of the transporting tray that moves desired materials in the tray away from the driving means.

2. The conveyor according to claim 1, further comprising one or more magnets on the base.

3. The conveyor according to claim 1, wherein the faces of the first end plate and the second end plate are substantially planar and substantially parallel respective to one another.

4. The conveyor according to claim 1, wherein the first front face and the second front face are positioned opposite one another at a predetermined distance based upon the size of driving means, conveyor, or both.

5. The conveyor according to claim 1, wherein the sliding carriage moves in a substantially linear direction.

6. The conveyor according to claim 1, wherein the pulsating movement is substantially non-uniform.

7. The conveyor according to claim 1, further comprising a processing means for manipulating the driving means.

8. A driving means for development of a substantially non-uniform pulsating movement, the driving means being comprised of:
   a first end plate having a first front face and a first back face;
   a second end plate having a second front face and a second back face;
   one or more carriage guide pins, at least one of the one or more guide pins being connected between the first front face and the second front face;
   a sliding carriage frame positioned between the first front face and the second front face, wherein the sliding carriage frame substantially rests upon the one or more carriage guide pins;
   at least one spring connected at one end to an inner wall of the sliding carriage closest to the second front face and connected to at a second end to a tension adjusting collar;
   a solenoid connected to a bumper and positioned within the sliding carriage frame; and
   a switch connected to a power source such that when the at least one spring is in a expanded position, the switch and solenoid are substantially adjacent to each other;
   wherein as the switch is in a closed position when the sliding carriage frame is closest to the second front face and the spring is in an expanded position, the solenoid is energized thereby driving the bumper into the sliding carriage frame and moving the sliding carriage frame in a direction of the first front face until the compressed spring directs the sliding carriage frame back towards the second front face, the reciprocating motion of which causes pulsating movement.

9. The driving means according to claim 8, wherein the faces of the first end plate and the second end plate are substantially planar and substantially parallel respective to one another.

10. The driving means according to claim 8, wherein the first front face and the second front face are positioned opposite one another at a predetermined distance based upon the size of driving means, conveyor, or both.

11. The driving means according to claim 8, wherein the sliding carriage moves in a substantially linear direction.

12. The conveyor according to claim 8, further comprising a processing means for manipulating the driving means.

13. A method of transporting one or more parts, the method being comprised of the steps of:
   positioning the one or more parts on a transporting tray of a conveyor, wherein the conveyor is comprised of:
      a base plate having a first end and a second end;
      the transporting tray resting on top of the base plate;
      a driving means connected to the first end of the base plate and connected to the transporting tray, the driving means being comprised of:
         a first end plate having a first front face and a first back face;
         a second end plate having a second front face and a second back face;
         one or more carriage guide pins, at least one of the one or more guide pins being connected between the first front face and the second front face;
         a sliding carriage frame positioned between the first front face and the second front face, wherein the sliding carriage frame substantially rests upon the one or more carriage guide pins;
         at least one spring connected at one end to an inner wall of the sliding carriage closest to the second front face and connected to at a second end to a tension adjusting collar;
         a solenoid connected to the base plate, connected to a bumper, and positioned within the sliding carriage frame; and
         a switch connected to a power source such that when the at least one spring is in a expanded position, the switch and solenoid are substantially adjacent to each other;
   energizing the solenoid to drive the bumper into the sliding carriage frame when the switch is in a closed position such that the sliding carriage frame is closest to the second front face and the spring is in an expanded position, allowing the sliding carriage frame to move in a direction of the first front face until the compressed spring directs the sliding carriage frame back towards the second front face;

repeating the energizing step and allowing step to create a substantially non-uniform pulsating movement through the conveyor to cause the one or more parts to move in a direction away from the driving means.

14. The method according to claim 13, wherein the conveyor if further comprised of one or more magnets on the base.

15. The method according to claim 13, wherein the faces of the first end plate and the second end plate are substantially planar and substantially parallel respective to one another.

16. The method according to claim 13, wherein the first front face and the second front face are positioned opposite one another at a predetermined distance based upon the size of driving means, conveyor, or both.

17. The method according to claim 13, wherein the sliding carriage moves in a substantially linear direction.

18. The method according to claim 13, further comprising a processing means for manipulating the driving means.

* * * * *